Patented Sept. 5, 1950

2,521,288

UNITED STATES PATENT OFFICE 2,521,288

ANION-EXCHANGE RESINS IN SPHEROIDAL FORM

William L. Evers, Moorestown, N. J., assignor to Rohm & Haas Company, Philadelphia, Pa., a corporation of Delaware No Drawing. Application August 29, 1947, Serial No. 771,395

6 Claims. (Cl. 260—45)

This invention relates to a process for preparing anion-exchange resins in the form of insoluble and infusible spheroids, globules, or "beads," as well as to the resulting product.

In the preparation of ion-exchange resins heretofore, it was customary to condense the reactants in a solvent until a resinous gel formed and thereafter to heat the gel en masse, usually in an oven, until it was converted into a porous, insoluble, and infusible mass which was then granulated by grinding and screened to a size suitable for the intended use. This procedure was not only very time-consuming but the grinding resulted in particles which varied greatly in size including about 20% of "fines"; that is, particles which were too small for the customary applications of ion-exchange resins.

In accordance with this invention, anion-exchange resins are made in spheroidal form in much less time than is required by former methods. In addition, the quantity of undesirable fines is markedly reduced and the product is far more uniform.

The ion-exchange resins in spheroidal form have real advantages over ion-exchange resins in the usual irregular, granular form. Thus, the spheroids of resin pack more densely and especially more uniformly in ion-exchange columns or beds and have a much higher capacity per unit of volume than do granulated resins of the same approximate size. At the same time, the spheroids do not become wedged or compressed together, as do granules, with subsequent clogging of the equipment. This last is of great importance in the operation of ion-exchange units; and, with the use of spheroids, there is much less head loss. Beds or layers of spheroidal particles may be back-washed and also regenerated much more rapidly and efficiently than beds of granular particles. Whereas the liquids pass freely through beds of spheroids during back-washing, they pass much less freely through beds of compacted granules and in many cases force the entire bed up against the top of the vessel containing the resin and thereby plug the orifices. When flow rates are high, a fluid passes through a bed of spheroids in streamlined flow as contrasted with its turbulent flow through a bed of granulated particles. Furthermore, the loss of attrition of spheroidal particles of resin is much less than in the case of granulated particles. This apparently is due to the ability of the spheroids to roll freely, whereas the irregularly-shaped granules constantly abrade one another, resulting in loss of resin which often is as high as 5% per year in commercial installations.

The anion resins which may be produced in spheroidal form by the process of this invention are well-known from a chemical standpoint. They have been described chemically in patents such as the following: 2,341,907 to Cheetham et al., February 15, 1944; 2,354,172 to Myers et al., July 18, 1944; 2,354,671 and 2,354,672 to Eastes, August 1, 1944; 2,356,151 to Eastes, August 22, 1944; 2,362,086 to Myers et al., November 7, 1944; and 2,402,384 to Eastes, June 18, 1946. Thus, they all contain amino groups and are the insoluble, infusible condensates of formaldehyde with a phenol and an amine. The phenols which are employed are known as "methylol-forming phenols" in that, as a class, they react with formaldehyde to form intermediate water-soluble condensates containing methylol groups. These intermediate condensates are then reacted with amines, especially polyalkylene polyamines. Amino groups are thus introduced into the molecules of the phenol-formaldehyde condensate. Further heating causes further condensation of the heat-convertible condensate to the insoluble, infusible "C-stage."

It has now been found that insoluble, infusible, anion-exchange resins in spheroidal form and having the above-noted advantages over granulated resins of the same chemical composition may be produced by condensing and insolubilizing the resins, under the influence of heat and mechanical agitation, in a liquid which is a non-solvent for the condensate. Agitation and heating are maintained simultaneously, and under such conditions the thermosetting condensate takes the form of small liquid spheroids or droplets which are then converted to the "C-stage."

It is preferred, though not essential, to have the resinous condensate at a well-advanced state before dispersing it in the dispersing medium since this reduces the time required to convert the spheroidal droplets of condensate to the insoluble and infusible form. Furthermore, all other factors being constant, a highly condensed material tends to produce smaller spheroids than one which is not condensed so far. In all cases, however, the condensate must be in a fluid condition when it is mixed with and dispersed in the dispersing liquid. One precaution must be observed; namely, that the condensate not be in a gelled condition when it is added to the inert, dispersing liquid, because a gelled condensate does not disperse satisfactorily. Condensation must be stopped short of gelation, or solvents must be added to insure that the resinous material has flow and is in the liquid state when it is admixed with the inert dispersing liquid. In an alternative, though less desirable, procedure, the components of the thermosetting resin may be dissolved and/or mixed in a liquid, such as water, which is not a solvent for the condensate although it may be a solvent for the components. As condensation progresses under these conditions, the thermosetting resinous condensate separates from the liquid and is then dispersed as small liquid droplets therein by the agitation.

The liquid in which the resinous condensate is dispersed must be inert under the conditions of operation and must not react chemically with the condensate. It must also be a non-solvent for the thermosetting condensate. Its boiling point should be at least as high as that of water, and preferably over 140° C., so that the thermal conversion of the resinous condensate will take place rapidly. Organic, water-immiscible liquids are preferred. The upper limit of boiling point range is not critical, although 200° C. is preferred. Organic liquids which boil above 200° C. may be used, provided they are inert and preferably non-miscible with water. In such cases where high-boiling organic liquids are employed, the liquid is merely heated to, and held at, a temperature which causes conversion of the resin and vaporization of any water which may be present, regardless of whether or not the liquid boils. In addition, it is desirable, though not essential, that the density of the liquid be approximately that of the condensate so that the latter does not tend to settle in or float upon the liquid.

Satisfactory organic, water-immiscible liquids for this purpose include halogenated organic compounds, particularly the halogenated aromatic compounds, examples of which are ortho-, meta-, and para-dichlorbenzene, dichlor-diethyl ether, 2,2-dichlor-1-bromethane, butylidene chloride, 1,4-dichlorbutane, alpha-naphthyl chloride, p-chlorphenetole, o-bromanisole, brom-diphenyl ether, ortho- and meta-dibrombenzene, 1,2-dibromhexane, ortho- and meta-tolyl bromide, and the like. In those cases where the resinous condensate is insoluble in water, water itself may be used as the dispersing medium.

Mineral oils also may be used as the inert organic liquid. While, for this purpose, a heavy, white, refined oil of U. S. P. grade is preferred, other grades, such as transformer oils, have been used successfully. Although the density of such oils is less than that of the condensate, the higher viscosity of the oil is a compensating factor; and, as a result, the particles of resin remain uniformly suspended. Mineral oils having a viscosity of about 100 to about 500 S. U. S. at 100° F. are recommended.

Dispersing agents greatly assist in holding the resin particles in suspension during the heating period and also prevent the particles from coalescing into larger aggregates as they are heat-converted. This is especially true when the halogenated hydrocarbons are employed. When other factors are held constant, an increase in the amount of the dispersing agent results in the formation of smaller spheroids and an increased tendency of the mixture to foam. Satisfactory amounts of dispersing agents range from 0.02% to 0.5%, based upon the amount of resinous condensate per se, although an upper limit of 0.1% is preferred. A wide variety of well-recognized dispersing agents may be employed, including sodium and potassium soaps of fatty acids, such as sodium stearate and potassium oleate, sodium polymethacrylate, and synthetic dispersing agents, especially those having very high molecular weight such as are described in United States Patents Nos. 2,115,192, 2,167,325, and 2,167,326. The dispersing agent can be added before, during, or after the mixing of the resinous condensate and the dispersing liquid.

It is necessary that agitation be maintained throughout the heating period. Conventional means may be employed. When all other factors are held constant, an increase in the degree of agitation will result in the formation of smaller spheroids.

During the period of heating and agitation, the liquid resinous material continues to condense and polymerize. The liquid spheroidal particles go through a gel stage as the heating progresses, and ultimately the gelled particles are converted to the insoluble and infusible stage. For the most part, the particles have the appearance of small spheroids or globules, although some may be slightly flattened or elongated due presumably to collision during their formation.

The time required to convert the spheroidal particles to their final form is in all cases much less than is required when the condensate is converted en masse at the same temperature by the methods of the prior art. This is due to better heat transfer in the case of the small particles as contrasted with the very slow heat transfer through a large mass of resinous condensate.

Temperature is a most important factor in the conversion of the resinous particles to the final heat-converted stage. For purposes of speed and economy, it is desirable that the temperature be as high as possible. The upper limit of temperature is that at which the resinous condensate chars or decomposes. The lower limit is that at which water may be distilled off. Suitable temperatures are from about 100° C. to about 200° C., while those from about 130° C. to about 180° C. are preferred.

After the particles of condensate have been converted to the infusible stage, they are removed from the dispersing liquid by conventional means, such as by filtering or centrifuging, and are then washed, dried, and screened.

The following examples illustrate the process of this invention.

*Example 1*

57 parts of diphenylol dimethyl methane and 8 parts of sodium hydroxide were added to 150 parts of water and the mixture was stirred for 15 minutes to effect solution of some of the phenol. There was then added 40 parts of 37% aqueous solution of formaldehyde. The mixture was held at 50°–60° C. for two hours and was then cooled to 30° C. at which point 73 parts of triethylene tetramine was slowly added. An exothermic reaction occurred which was controlled by cooling. After the amine had been added, the mixture was heated to 85° C., 80 parts of formaldehyde solution was added, and the temperature was maintained at 75°–80° C. for one hour.

The above mixture was then poured into a three-liter, three-necked flask containing 1600 grams of mineral oil and equipped with thermometer, mechanical stirrer and condenser. The contents of the flask was agitated, was heated to 140° C. and held at 130° C. for three hours. Water distilled off during the heating process and the condensate formed hard spheroids, all of which were separated from the oil and were washed and dried. They had high capacity for adsorbing anions.

*Example 2*

The following reactants were mixed in a five-liter, three-necked flask equipped with reflux condenser, thermometer, and mechanical agitator: 165 grams (1.5 mols) of resorcinol, 62 grams (0.75 mol HCHO) of a 37% aqueous solution of formaldehyde, and 0.75 gram of concentrated hydrochloric acid. The mixture was vigorously agitated and was heated to refluxing temperature and held there for two hours. A mixture of 480 grams (12 mols) of sodium hydroxide, 232 grams (1.5 mols) of triethylene tetramine, and 1950 grams of water was added and the mixture was heated to 100° C. Then, 858 grams (6 mols) of Chlorex (dichlorodiethyl ether) was added and the mixture was held at refluxing temperature for 20 hours. Hard, insoluble and infusible pellets of resin were obtained which were washed and dried. These showed good anion-adsorbing properties.

*Example 3*

The following reactants were mixed in a two-liter, three-necked flask equipped with thermometer, agitator, and reflux condenser: 55 grams (0.5 mol) of resorcinol, 215 grams (1.5 mols) of Chlorex, 40 grams (1.0 mol) of sodium hydroxide, and 125 grams of water. The mixture was agitated and refluxed for 24 hours. A solution of 80 grams (2 mols) of sodium hydroxide in 775 grams of water was added together with 55 grams (0.5 mol) of diethylene triamine and the mixture was refluxed for 24 hours during which small spheroids of insoluble, infusible resin were formed. The spheroids were separated, washed, and dried. They had capacity for adsorbing anions.

It is possible to vary the size of the resinous spheroids from one batch to another by varying such factors as the rate of agitation, the amount and kind of agitation, the temperature, the constituents of the resinous condensate, and the like. In any one batch, however, the particles will vary over only a narrow range of sizes; and this is decidedly advantageous. Rapid agitation, high concentration of dispersing agent, and a high degree of condensation prior to dispersing are all factors which tend to make for small spheroids. Spheroids having an average diameter from 0.2 mm. to 0.8 mm. are much preferred when the material is to be used in conventional ion-exchange processes although particles from 0.2 mm. to 2.0 mm. may be employed to advantage.

I claim:

1. A process for preparing anion-exchange resins in spheroidal form which comprises dispersing a heat-reactive condensate of a methylol-forming phenol, formaldehyde, and an alkylene polyamine in the form of liquid spheroids in a dispersing liquid which is a non-solvent for said condensate, simultaneously agitating the resultant dispersion and heating same at a temperature from 100° C. to 200° C. until said spheroids are converted to the insoluble, infusible stage, and separating said dispersing liquid and said spheroids.

2. A process for preparing anion-exchange resins in spheroidal form which comprises preparing in aqueous solution a resinous, thermosetting condensate of formaldehyde, a methylol-forming phenol, and an alkylene polyamine, mixing said solution of said condensate with a water-immiscible organic liquid which is inert toward said condensate and is a non-solvent therefor, agitating the mixture and dispersing said solution in the form of fluid spheroids in said organic liquid, continuing the agitation, and simultaneously heating said mixture from 100° C. to 200° C. until said pheroids are free of water and are converted to the insoluble, infusible, porous state, and separating said organic liquid and said pheroids.

3. A process for preparing anion-exchange resins in spheroidal form which comprises preparing in aqueous solution a resinous, thermosetting condensate of formaldehyde, a methylol-forming phenol and an alkylene polyamine, mixing said solution of said condensate with a mineral oil having a viscosity of 100 to 500 S. U. S. at 100° F. which is inert toward said condensate and is a non-solvent therefor, agitating the mixture and dispersing said solution in the form of fluid spheroids in said mineral oil, continuing the agitation, and simultaneously heating said mixture from 100° C. to 200° C. until said spheroids are free of water and are converted to the insoluble, infusible, porous state, and separating said mineral oil and said spheroids.

4. A process for preparing an anion-exchange resin in spheroidal form which comprises dispersing a heat-reactive condensate of diphenylol dimethyl methane, formaldehyde, and triethylene tetramine in the form of liquid spheroids in a dispersing liquid which is a non-solvent for said condensate, simultaneously agitating the resultant dispersion and heating same at a temperature from 100° C. to 200° C. until said spheroids are converted to the insoluble, infusible stage, and separating said dispersing liquid and said spheroids.

5. A process for preparing an anion-exchange resin in spheroidal form which comprises dispersing a heat-reactive condensate of resorcinol, formaldehyde and triethylene tetramine in the form of liquid spheroids in a dispersing liquid which is a non-solvent for said condensate, simultaneously agitating the resultant dispersion and heating same at a temperature from 100° C. to 200° C. until said spheroids are converted to the insoluble, infusible stage, and separating said dispersing liquid and said spheroids.

6. A process for preparing an anion-exchange resin in spheroidal form which comprises dispersing a heat-reactive condensate of resorcinol, formaldehyde, and diethylene triamine in the form of liquid spheroids in a dispersing liquid which is a non-solvent for said condensate, simultaneously agitating the resultant dispersion and heating same at a temperature from 100° C. to 200° C. until said spheroids are converted to the insoluble, infusible stage, and separating said dispersing liquid and said spheroids.

WILLIAM L. EVERS.

REFERENCES CITED

The following references are of record in the file of this patent:

UNITED STATES PATENTS

| Number | Name | Date |
|---|---|---|
| 2,194,354 | Crawford et al. | Mar. 19, 1940 |
| 2,341,907 | Cheetham et al. | Feb. 15, 1944 |
| 2,354,671 | Eastes | Aug. 1, 1944 |
| 2,384,945 | Marisic | Sept. 18, 1945 |